No. 678,025. Patented July 9, 1901.
G. V. ORTON.
VEHICLE WHEEL.
(Application filed Mar. 29, 1901.)
(No Model.)

Witnesses,

Inventor,
Gerrit V. Orton
By Duway Strong & Co
Attys

UNITED STATES PATENT OFFICE.

GERRIT V. ORTON, OF MONTEREY, CALIFORNIA, ASSIGNOR OF ONE-TWENTIETH TO DAVID JACKS, OF SAME PLACE.

VEHICLE-WHEEL.

SPECIFICATION forming part of Letters Patent No. 678,025, dated July 9, 1901.

Application filed March 29, 1901. Serial No. 53,379. (No model.)

*To all whom it may concern:*

Be it known that I, GERRIT V. ORTON, a citizen of the United States, residing at Monterey, county of Monterey, State of California, have invented an Improvement in Vehicle-Wheels; and I hereby declare the following to be a full, clear, and exact description of the same.

My invention relates to improvements in wheel attachments whereby the tire and rim are held together without the use of bolts or similar binding devices and whereby the spokes may be tightened and the fellies expanded whenever necessary.

It consists, essentially, of a peripheral channel formed on the inner side of the tire, a peripheral projection upon the rim fitting said channel, a dowel-key whereby the alinement of the fellies is maintained and by which they are expanded, a seat for the spoke-tenons, a jam-nut by means of which the spokes may be tightened, and of details more fully to be hereinafter described.

Figure 1:
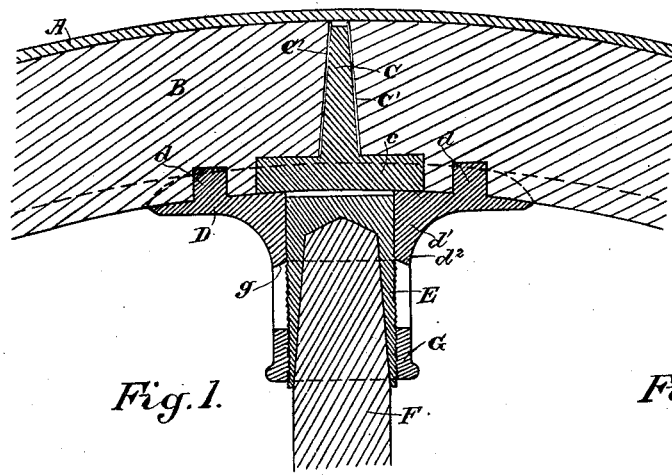
Figure 2:
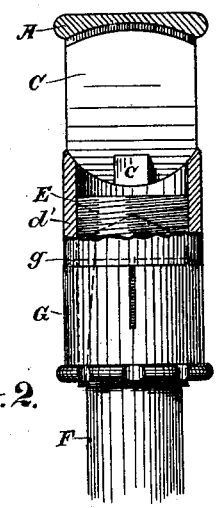
Figure 3:
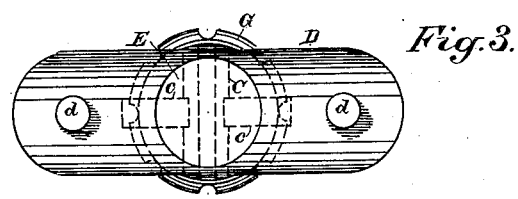
Figure 4:
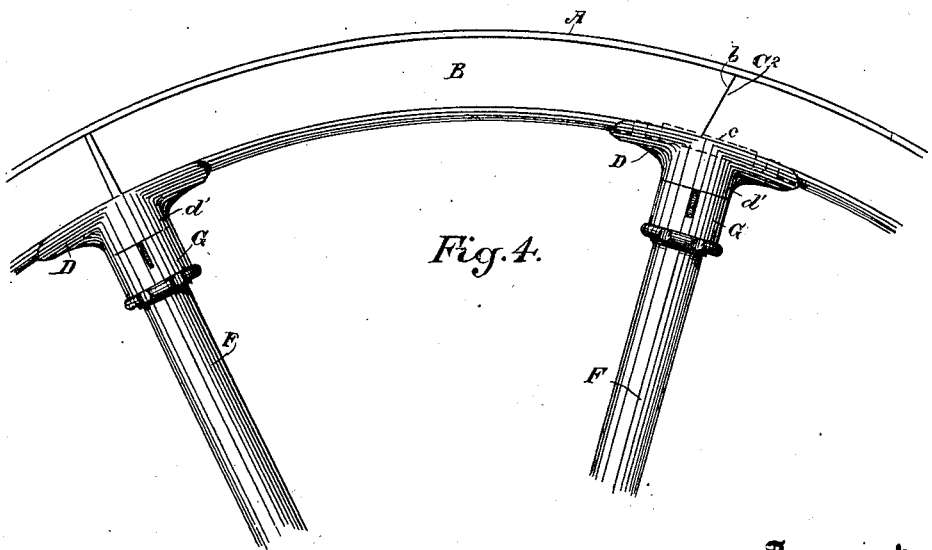

Having reference to the accompanying drawings, Figure 1 is a longitudinal section through the rim and connections. Fig. 2 is a partial section of the same at right angles to Fig. 1. Fig. 3 is a top view of the saddle. Fig. 4 shows part of the wheel, the right-hand side showing a modification.

As shown, the tire A differs from the ones of ordinary construction in that its inner side is concaved to fit the convexity of the rim B. Consequently when this rim is made to press snugly and firmly against the tire no other means is necessary to hold the two together, displacement is impossible, and the rim is not weakened by the necessity of the ordinary tire and clip-bolts.

While I have shown the tire as concaved on its inner side, I do not wish to limit myself to that form of peripheral channel alone. In fact the projection might be upon the tire and its corresponding depression in the rim. The advantage of concaving the tire and convexing the rim is that the weight of the rim is not unnecessarily increased, while greater strength and rigidity are afforded to the rim.

The joints of the fellies forming the rim are left open for the insertion of the dowel and expansion keys C. These keys are wedge-shaped and are provided with a base projection $c$, which is let into mortises in the contiguous ends of the fellies and form a dowel by which the fellies are held in line. This dowel projection offers a solid metal base also for the plates or saddles D to rest upon. These saddles are held in place on the rim by means of lugs or nibs $d$, fitting recesses in the rim. Each saddle is made with a central hollow projection or collar portion $d'$, in which a cap or ferrule E is adapted to fit, and which cap serves as a seat for the spoke-tenon. These ferrules are provided with a fine exterior thread and are interiorly tapered to receive the spoke-tenons F.

Upon the ferrules are the nuts G. The latter are made with an outwardly-beveled edge $g$, which abuts against the inwardly-beveled shoulder $d^2$ of the saddle. I prefer these nuts in the form of split nuts. By turning these nuts outwardly the wheel is tightened and at the same time the nut is made friction-locking by its compression against the ferrule and the saddle. To compensate for contingencies in case of the key becoming loose or it is desired to retighten the rim, I use thin plates or shims, as C', made of sheet metal. These shims can be inserted between the joints of the fellies by slackening up the set-nuts G and backing up the key sufficiently. By seating the tenons in the manner shown they are relieved from much of the strain usual where set directly into the wooden rim and at the same time greater elasticity is given the spokes. Furthermore, by obviating the necessity for the use of perforations in the rim, either for the securing of the tire or the seating of the spoke-tenons, the rim is prevented from splitting or bruising and its durability greatly increased. The rim put thus into the tire forms a solid perfect-fitting arch. The adjustment of the hub and spokes thereto is made certain and nice. The fellies are not burned, and the wheel is not dished nor unequally strained.

In Fig. 4 I have shown a modification of my rim and its attachments wherein I dispense with the expansion-key by inclining the contiguous ends $b$ of the fellies. In this case I provide a suitable dowel, whereby the fellies are held in alinement, and the rim is expanded as before by means of the jam-nut G and the saddle pressing upon the fellies acting to move the latter upon each other on the principle of two contacting wedges. Any space between the fellies may be taken up by shims $C^2$. These shims ordinarily correspond to the end surface of the fellies.

Having thus described my invention, what I claim as new, and desire to secure by Letters Patent, is—

1. In a vehicle-wheel the combination with a rim and a tire, of a wedge-shaped key between the meeting ends of adjacent fellies and having an extended base portion let into mortises in the under surfaces of said fellies whereby the rim may be expanded.

2. In a vehicle-wheel, the combination of a tire having a peripheral channel upon its inner side, a rim having a peripheral projection adapted to fit said channel, and means including a wedge-shaped key between adjacent fellies and having an extended base portion let into mortises in said fellies whereby the rim may be held firmly against the tire.

3. In a vehicle-wheel, the combination of a tire having its inner surface concaved, a rim having the outer faces of its sections convexed to fit the concavity of the tire, and means including a wedge-shaped key between adjacent fellies and having an extended base portion let into mortises in said fellies whereby the ends of these sections are moved in relation to each other to expand the rim.

4. The combination in a vehicle-wheel with the tire and fellies thereof, of caps fitting over the ends of the spokes, guides for said caps, and nuts upon said caps adapted to bear against the guides whereby the wheel may be tightened.

5. The combination in a vehicle-wheel with the tire and rim thereof of a cap fitting the end of each of the spokes and bearing against the rim, a plate or guide upon the rim through which the cap passes, and a nut upon the cap having a bevel edge impinging upon a similar bevel upon the guide.

6. In a vehicle-wheel the combination of a tire having a peripheral channel on its inner side, a rim with its sections convexed to fit the concavity of the tire, plates between these sections, means by which the alinement of the sections is maintained, saddles upon the sections, caps or ferrules upon the ends of the spokes, said saddles adapted to receive the ferrules, and split nuts upon the ferrules having a lower outwardly-beveled face impinging upon an inwardly-beveled shoulder on the saddles.

In witness whereof I have hereunto set my hand.

GERRIT V. ORTON.

Witnesses:
JNO. P. LEONARD,
WM. L. LEONARD.